United States Patent [19]

Koumoto et al.

[11] Patent Number: 5,182,754
[45] Date of Patent: Jan. 26, 1993

[54] MICROPROCESSOR HAVING IMPROVED FUNCTIONAL REDUNDANCY MONITOR MODE ARRANGEMENT

[75] Inventors: Yasuhiko Koumoto; Koji Maemura, both of Tokyo, Japan

[73] Assignee: NEC Corporation

[21] Appl. No.: 477,051

[22] Filed: Feb. 9, 1990

[30] Foreign Application Priority Data

Feb. 9, 1989 [JP] Japan .................. 1-31458

[51] Int. Cl.⁵ .................. G06F 15/16; G06F 7/02
[52] U.S. Cl. .................. 371/68.3; 371/12
[58] Field of Search .................. 371/68.3, 12

[56] References Cited

U.S. PATENT DOCUMENTS

| | | | |
|---|---|---|---|
| 3,810,119 | 5/1974 | Zieve et al. | 371/68.3 |
| 4,012,717 | 3/1977 | Censier et al. | 371/68.3 |
| 4,049,957 | 9/1977 | Kera et al. | 371/68.3 |
| 4,400,792 | 8/1983 | Strelow | 371/68.3 |
| 4,839,908 | 1/1989 | Takayama | 371/12 |

FOREIGN PATENT DOCUMENTS

| | | | |
|---|---|---|---|
| 2915401 | 10/1979 | Fed. Rep. of Germany | 371/68.3 |
| 0044632 | 2/1989 | Japan | 371/12 |

Primary Examiner—Robert W. Beausoliel
Assistant Examiner—Allen M. Lo
Attorney, Agent, or Firm—Foley & Lardner

[57] ABSTRACT

A plurality of gates are arranged between a coincidence circuit and a group of comparators which compare data outputted by a processor's output buffers, and data inputted to the processor via terminals during a monitor mode. An invalid byte information generator is connected to the gates and applies a signal selected to mask the effects of write instructions being executed on an incomplete word and therefore prevents the generation of an erroneous mismatch signal.

3 Claims, 4 Drawing Sheets

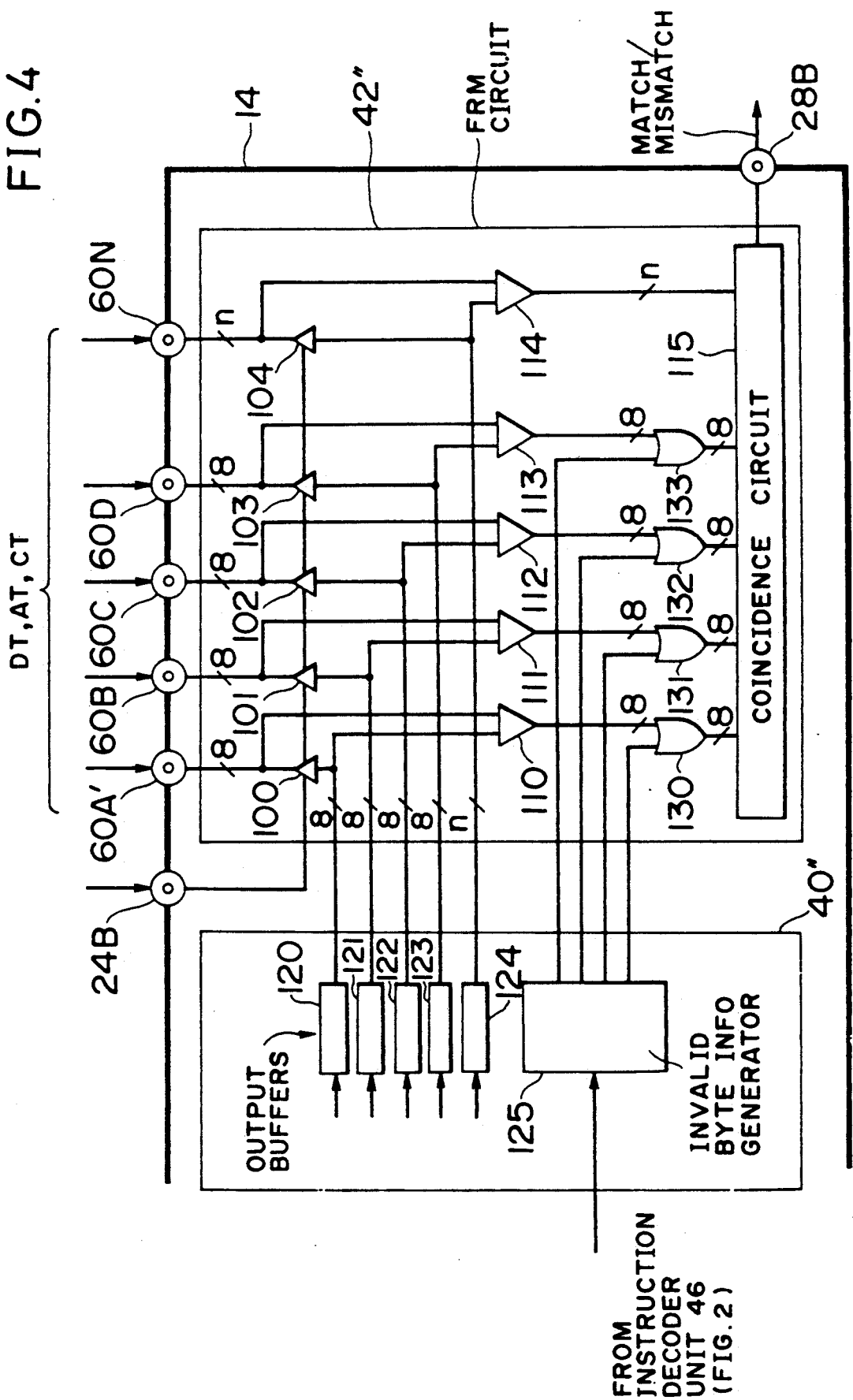

MICROPROCESSOR HAVING IMPROVED FUNCTIONAL REDUNDANCY MONITOR MODE ARRANGEMENT

BACKGROUND OF THE INVENTION

1. Field of the Invention

This invention relates to a microprocessor, and more particularly to a microprocessor having an improved functional redundancy monitor (FRM) mode arrangement through which a highly reliable multiple processor system can be realized.

2. Description of the Prior Art

With the recent noticeable developments in microprocessor systems, a variety of extensive applications thereof have been found in arrangements such as electronic telephone exchanges, bank on-line teller systems, medical apparatus, etc. However, computer systems for use in such arrangements are required to exhibit strictly reliable operation.

One approach to meeting this strict reliability requirement is to utilize a multiple processor system, in which two processors are included and are arranged to operate independently of one another in different modes (viz., normal and FRM modes). This enables the operation of the processors to be monitored and any abnormalities detected. More specifically, the execution results (addresses and/or data obtained by instruction execution) of the two processors are compared within the FRM mode processor to determine the presence or absence of a malfunction and/or abnormality. These two processors are interconnected through address, data and control buses.

A normal mode processor performs the usual overall system control by outputting an address for fetching an instruction(s) designated thereby, driving the above-mentioned buses and fetching the instruction(s) from a program memory, executing the fetched instruction(s), and again driving the buses for reading data from the memory or writing data thereinto.

On the other hand, the FRM mode processor, operates independently of the normal mode processor but in exactly the same manner. That is to say, the FRM mode processor generates an address for fetching the same instruction(s) as the normal mode processor, fetches and executes. However, the FRM mode processor doos not access either the memory or the peripheral units, viz., it drives neither of the above-mentioned buses for said purposes. The FRM mode processor receives the execution results from the normal mode processor, and compares them with those generated therewithin. In the event that the execution results of the two processors do not coincide, the FRM processor outputs a mismatch signal which is applied to a system control unit, which in turn temporarily freezes the operations of the two processors and subsequently restarts them.

Before discussing the present invention in detail, a known processor operating in an FRM mode will be described with reference to FIGS. 1, 2 and 3, in which FIGS. 2 and 3 will again be referred to later in connection with the present invention.

FIG. 1 is a block diagram schematically showing a multiple processor system 10 including two processors 12 and 14.

Referring now to FIG. 1, the two processors 12 and 14 have the same configuration. Each of the processors 12 and 14 has data terminals (DT), address terminals (AT) and control terminals (CT), which are respectively coupled to data, address and control buses 16, 18 and 20 in the illustrated manner. Further, a memory 34 for storing an execution program(s) and peripheral units 36 are provided. It is assumed that the processors 12 and 14 operate in normal and FRM mode, respectively.

The processor 12 is provided with a terminal 24A arranged to receive a mode designation signal (NFMD). When this signal assumes a logic "1" (for example) the processor 12 is induced to operate in a normal mode. The processor 12 further has a freeze terminal 26A and a match/mismatch terminal 28A. The freeze terminal 26A receives, from a system control unit 32, a freeze signal (BFREZ) which temporarily stops the operation of the processor 12 in the event that a mismatch is detected between the execution results of the two processors 12 and 14. It should be noted that the processor 12 has been assumed to operate in a normal mode with the match/mismatch terminal 28A open (namely not in use). The terminals 24A, 26A are coupled to the system control unit 32. Further, a clock generator 30 is coupled to the processor 12 by means of a clock terminal 22A. One of control signals generated from the control terminals CT is a bus cycle start signal BCYST indicative of the beginning of each bus cycle. The signal BCYST is applied to the system control unit 32.

Similarly, the other processor 14 is provided with a plurality of terminals 22B, 24B, 26B and 28B, which correspond to the terminals 22A, 24A, 26A and 28A of the processor 12, respectively. The processor 14 is induced to operate in an FRM mode in response to a mode designation signal (NFMD) which assumes a logic "0" (for example). In the FIG. 1 arrangement a match/mismatch signal is applied from the processor 14 to the system control unit 32 via the terminal 28B.

FIG. 2 is a block diagram showing the processor 14 in FIG. 1. Processor 12 features the same arrangement as processor 14 and hence details of its construction are not shown in FIG. 2 for brevity.

As shown in FIG. 2, the processor 14 includes a bus control unit 40 for controlling the buses DT, AT and CT by way of an FRM circuit 42, an instruction prefetch unit 44, an instruction decoder 46 for decoding instructions applied from the unit 44, an effective address unit 48 for determining effective addresses for operand data, and an execution unit 50. These circuits are coupled as shown. The above-mentioned circuits 40, 44, 46, 48 and 50 are well known to those in the art. Accordingly, a detailed description thereof is omitted for simplicity.

The FRM circuit 42 is provided between the bus control unit 40 and the buses DT, AT and CT via a plurality of terminals 60A–60N. As previously mentioned, the processor 14 operates in an FRM mode in response to the NFMD signal, which is applied to the FRM circuit 42 through the terminal 24B, assuming a logic "0". The match/mismatch signal, generated from the FRM circuit 42, will now be described in detail with reference to FIG. 3.

FIG. 3 is a block diagram showing a known FRM circuit 42' and the bus control unit 40', which form part of the processor 14 (FIG. 2) and which respectively correspond to the circuit 42 and the unit 40 in FIG. 2. It should be noted that (a) the other circuits 44, 46 and 50 of the processor 14 (FIG. 2) are omitted in that they are applicable to the FIG. 3 arrangement with no modifications and (b) only an output stage of the unit 40' is illustrated in FIG. 3. It is assumed that the processor 14 is a 32 bit type.

The FRM circuit 42' includes two output drivers 70 and 72, two comparators 74 and 76 each of which performs bit-by-bit comparison between data applied thereto. This circuit further includes a coincidence circuit 78 having input terminals coupled to the outputs of the comparators 74 and 76. The output (viz., the match-/mismatch signal) of the coincidence circuit 78 is applied via the terminal 28B to the system control unit 32 (FIG. 1). Each of the output drivers 70, 72 includes a latch and a three-state bus driver (both not shown). On the other hand, the bus control unit 40' has an output stage including two output buffers 80 and 82, which store the execution results (data and addresses) obtained within the processor 14 itself. In more detail the output buffer 80 stores operand data, while the output buffer 82 stores address data. The output buffers 80 and 82 are respectively coupled to the comparators 74 and 76, and apply their contents to the comparators 74 and 76, respectively.

As previously mentioned, the processor 14 operates in an FRM mode in response to the NFMD assuming a logic "0". In such a case, the output drivers 70 and 72 are disabled whereby the operand and address data from the output buffers 80, 82 are not applied to the terminals 60A, 60N. On the other hand, in the case that the processor 14 operates in a normal mode in response to the NFMD assuming a logic "1", the output drivers 70, 72 are enabled permitting the contents of the output buffers 80, 82 to be applied to the buses DT and AT by way of the terminals 60A and 60N.

The coincidence circuit 78 is supplied with the outputs of the comparators 74, 76. In the event that all the comparators 74, 76 indicate coincidence, the circuit 78 outputs a match signal. In the absence of total coincidence, the coincidence circuit 78 generates a mismatch signal. These match and mismatch signals correspond to a match/mismatch signal which assumes logic "1" and "0" (by way of example only). In response to the mismatch signal the system control unit 32 (FIG. 1) applies the BFREZ signal to the processors 12, 14 in order to temporarily stop the operations thereof. Thereafter, the processors 12, 14 restart their operation.

However, the known arrangement shown in FIG. 3 has encountered the following difficulty. In the event that an erroneous signal appears at the output of the comparator 74 due to executing a write instruction on data which does not amount to a full 32 bits immediately after a restart, an erroneous output from the comparator 74 causes the coincidence circuit 78 to output a mismatch signal. In other words, in the event that (a) an output buffer 80 stores data which amounts to a full 32 bits at the time the processors 12, 14 cease their operations and (b) the output buffer 80 retains the data when the processors 12, 14 restart their operations after a given time interval, then there is the possibility that a mismatch signal is again generated irrespective of the normal operations of the processors 12, 14 when the processors 12, 14 actually taking place.

SUMMARY OF THE INVENTION

It is an object of this invention to provide a processor having an improved FRM monitor arrangement, by which a generation of an erroneous mismatch signal can be prevented.

In order to fulfill the above-mentioned object, a plurality of gates are arranged between buffers and a coincidence circuit. The gates are also coupled to terminals by which data is inputted during a monitor mode. An invalid byte information generator is connected to the gates and applies a signal selected to mask the effects of write instructions being executed on an incomplete word and therefore prevents the generation of an erroneous mismatch signal.

More specifically, the present invention is deemed to comprise a microprocessor which features: a plurality of output drivers for outputting contents of a plurality of corresponding output buffers by way of a plurality of terminals during a normal mode and for blocking the outputs of the plurality of output buffers to the plurality of terminals during a monitor mode; a plurality of comparators coupled to the plurality of output buffers and the plurality of terminals, the plurality of comparators being arranged to compare signals appearing on the terminals and the outputs of the output buffers in the monitor mode; a coincidence circuit; an invalid byte information generator coupled to the coincidence circuit by way of a plurality of logic gates, the plurality of logic gates being coupled between the comparators and the coincidence circuit, the invalid byte information generator and the plurality of logic gates defining masking means for preventing the output of an erroneous mismatch signal from the coincidence circuit.

BRIEF DESCRIPTION OF THE DRAWINGS

The features and advantages of the present invention will become more clearly appreciated from the following description taken in conjunction with the accompanying drawings in which:

FIG. 4 is a block diagram showing an FRM circuit according to the invention.

DETAILED DESCRIPTION OF THE PREFERRED EMBODIMENTS

An embodiment of the instant invention will be discussed with reference to FIG. 4.

Figure 2:
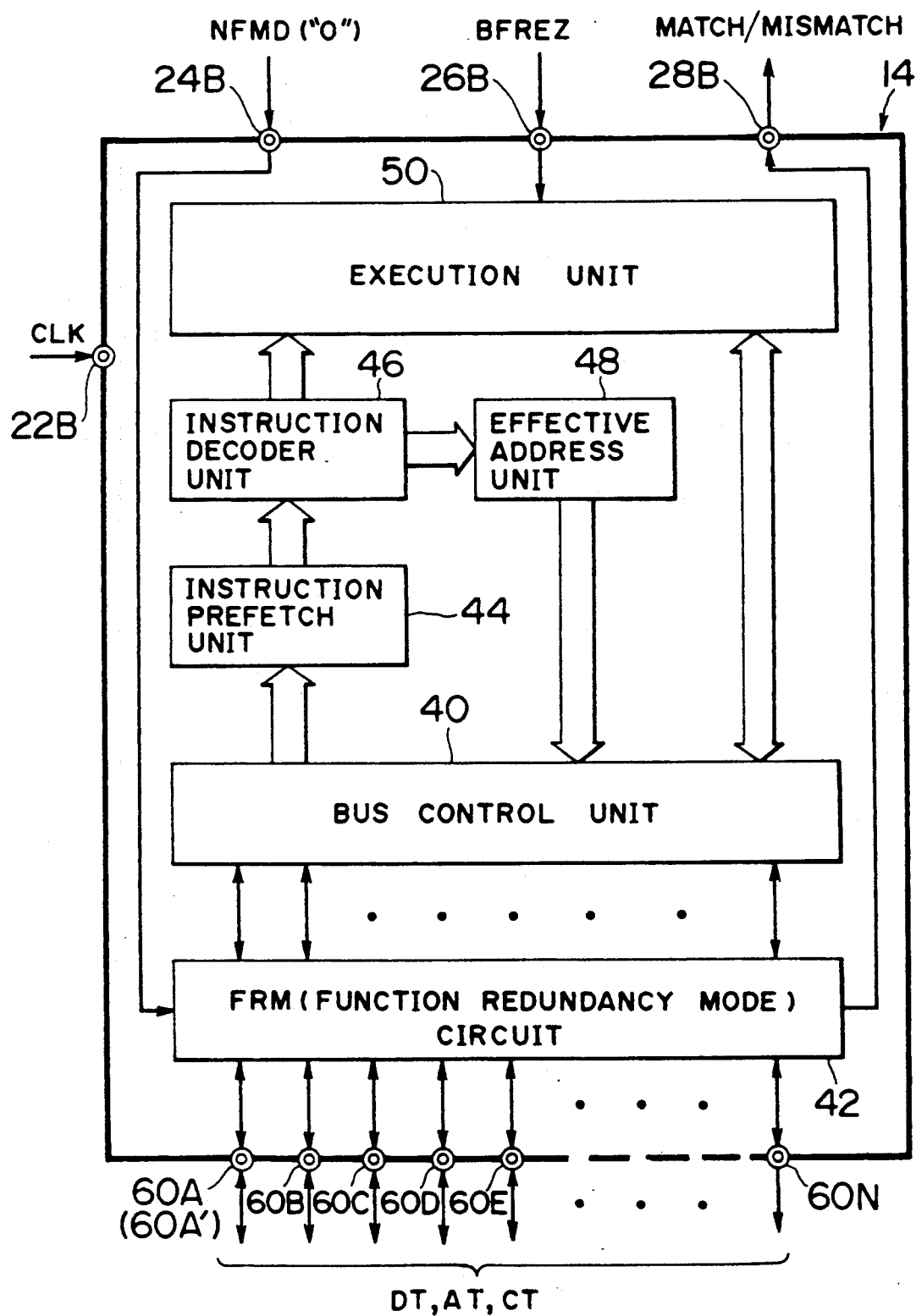
FIG. 2 is a block diagram showing part of the FIG. 1 arrangement, which has been discussed in the opening paragraphs of the instant disclosure.
Figure 3:
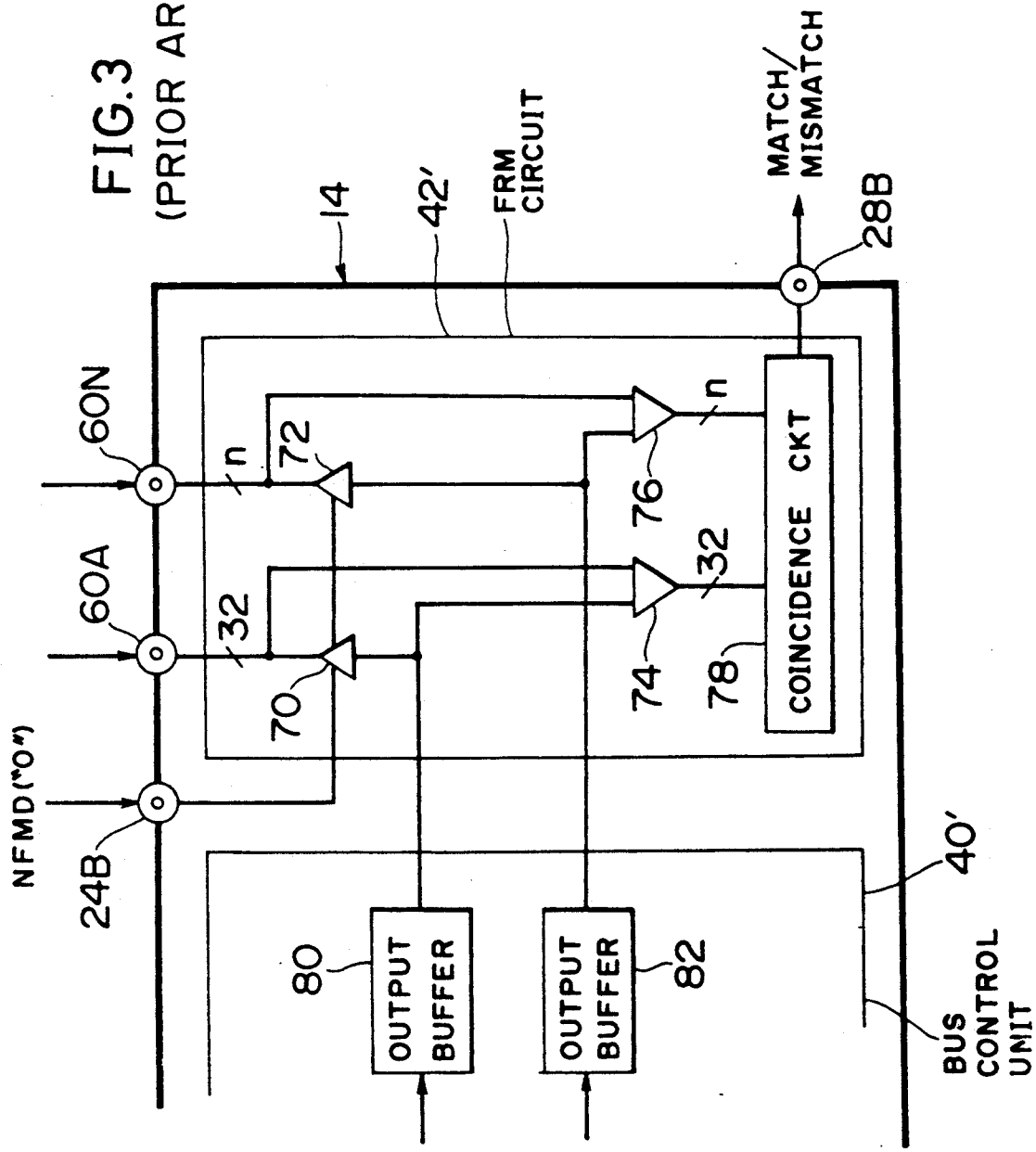
FIG. 3 is a block diagram showing a known FRM mode arrangement, which also has been discussed in the opening paragraphs of the instant disclosure.

FIG. 4 illustrates an FRM circuit 42" and a bus control unit 40", which respectively correspond to the circuit 42' and the unit 40' in FIG. 3. Similar to the FIG. 3 arrangement, the other units 44, 46 and 50 of the processor 14 (FIG. 2) are not shown in FIG. 4 in that they can be provided within the FIG. 4 arrangement with no or very little modification.

In FIG. 4, only an output stage of the bus control unit 40" is shown. In this case also it is assumed that the processor is of a 32-bit type.

Figure 1:
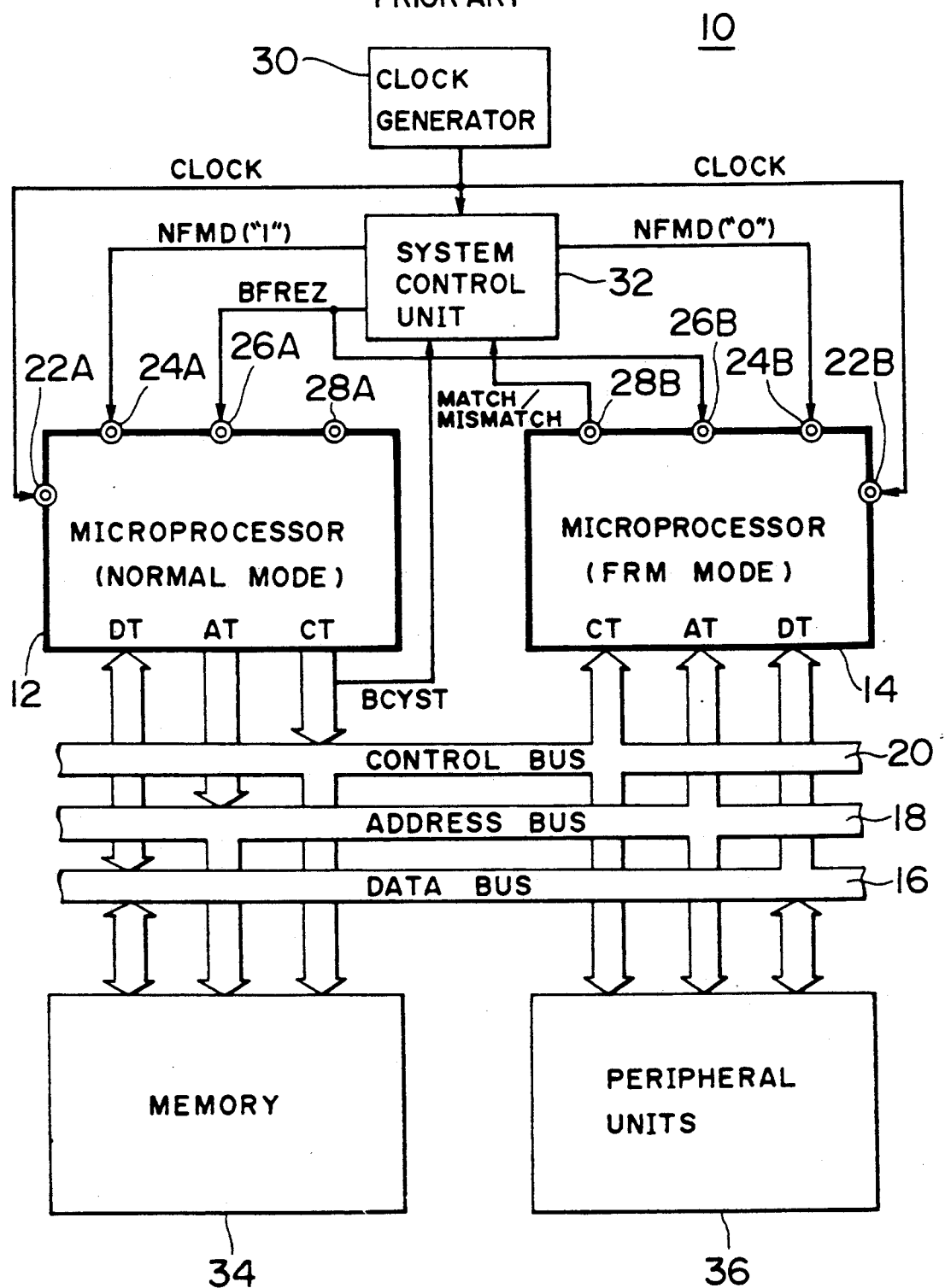
FIG. 1 is a block diagram showing a multi process system discussed in the opening paragraphs of the instant disclosure.

The FRM circuit 42" includes five output drivers 100 to 104, five comparators 110 to 114 each of which performs bit-by-bit comparison between data applied thereto on a byte basis, and further includes a coincidence circuit 115 having input terminals coupled to the outputs of the OR gates 130–133 and the comparator 114. The output of the coincidence circuit 115 (viz., match/mismatch signal) is applied to the system control unit 32 (FIG. 1) via the terminal 28B. Each of the output drivers 100 to 104 includes a latch and a three-state bus driver (neither shown).

The bus controller 40" has an output stage, which includes five output buffers 120 t0 124 and further includes an invalid byte information generator 125. The output buffers 120 to 124 corresponds the output buffers 80 and 82 in FIG. 3. The generator 125 is supplied with, from the instruction decoder unit 46 (FIG. 2), invalid byte information which indicate the number of invalid bytes and the position thereof, and then decodes the information received.

In the event that an erroneous signal appears at an output of one of the comparators 110 to 113 due to executing a write instruction on data which does not amount to a full 32 bits immediately after a restart, a corresponding invalid byte signal is applied to the appropriate OR by the invalid byte information generator 125. The effect of this is that an erroneous output from the comparator in question is reversed by the invalid byte signal. Accordingly, the coincidence circuit 115 receives an input indicative of coincidence due to the masking of the erroneous results from the comparator, and the FRM circuit is prevented from outputting a mismatch signal.

Although the above embodiment has been described as using OR gates in the masking arrangement, it is within the scope of the present invention to use AND gates in place thereof in the event that the logic level of the comparators 110 to 113 should be opposite.

It will be further understood that the present invention is not limited to arrangements having two processor and can be applied to systems having three or more processors. For example it is possible to apply the invention to systems wherein two processor are used for monitoring and wherein the results derived by the two monitoring units are used in a voting arrangement to determine which processor is in disorder.

While the foregoing description describes only one embodiment of the present invention, the various alternatives and modifications possible without departing from the scope of the present invention, which is limited only by the appended claims, will be apparent to those skilled in the art.

What is claimed is:

1. A microprocessor comprising:
    a plurality of output drivers for outputting contents of a plurality of corresponding output buffers by way of a plurality of terminals during a normal mode and for blocking the outputs of said plurality of output buffers to said plurality of terminals during a monitor mode;
    a plurality of comparators coupled to said plurality of output buffers and said plurality of terminals, said plurality of comparators being arranged to compare signals appearing on said terminals and the outputs of said output buffers in said monitor mode;
    a coincidence circuit;
    an invalid byte information generator coupled to said coincidence circuit by way of a plurality of logic gates, said plurality of logic gates being coupled between said comparators and said coincidence circuit, said invalid byte information generator and said plurality of logic gates defining masking means for preventing the output of an erroneous mismatch signal from said coincidence circuit.

2. A microprocessor as claimed in claim 1, wherein each of said logic gates is an OR gate.

3. A microprocessor as claimed in claim 1, wherein each of said logic gates is an AND gate.

* * * * *